US006929838B1

(12) United States Patent
McNeil

(10) Patent No.: US 6,929,838 B1
(45) Date of Patent: Aug. 16, 2005

(54) SHEET HAVING INDICIA REGISTERED WITH LINES OF TERMINATION

(75) Inventor: Kevin Benson McNeil, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1084 days.

(21) Appl. No.: 08/787,893

(22) Filed: Jan. 23, 1997

Related U.S. Application Data

(63) Continuation of application No. 08/621,268, filed on Mar. 25, 1996, now abandoned.

(51) Int. Cl.[7] .................................................. B32B 3/00
(52) U.S. Cl. ...................................... 428/43; 428/211.1
(58) Field of Search ............................ 428/195, 43, 53, 428/76, 192, 212, 411.1, 537.5, 195.1, 211.1

(56) References Cited

U.S. PATENT DOCUMENTS

| | | | | |
|---|---|---|---|---|
| 3,594,552 | A | 7/1971 | Adamson et al. | 235/92 MP |
| 3,847,047 | A | 11/1974 | Jackson | 83/344 |
| 3,914,047 | A | 10/1975 | Hunt, Jr. et al. | 355/16 |
| 3,958,051 | A | 5/1976 | Smith | 428/42 |
| 4,279,369 | A | 7/1981 | Passafiume | 225/3 |
| 4,416,534 | A | 11/1983 | Kluger | 355/14 SH |
| 4,512,256 | A | 4/1985 | Schriber et al. | 101/248 |
| 4,598,638 | A | 7/1986 | Fujii et al. | 101/76 |
| 4,610,649 | A | 9/1986 | Friess | 493/11 |
| 4,669,344 | A | 6/1987 | Herrig | 83/27 |
| 4,683,380 | A | 7/1987 | Shipkowski et al. | 250/548 |
| 4,734,868 | A | 3/1988 | DeLacy | 364/519 |
| 4,736,446 | A | 4/1988 | Reynolds et al. | 382/8 |
| 4,781,090 | A | 11/1988 | Feldkamper et al. | 83/74 |
| 4,805,111 | A | 2/1989 | Steidel | 364/469 |
| 4,914,477 | A | 4/1990 | Young et al. | 355/208 |
| 4,963,899 | A | 10/1990 | Resch, III | 346/157 |
| 5,063,416 | A | 11/1991 | Honda et al. | 355/316 |
| 5,160,946 | A | 11/1992 | Hwang | 346/157 |
| 5,270,769 | A | 12/1993 | Satoh et al. | 355/272 |
| 5,292,299 | A | 3/1994 | Anderson et al. | 493/11 |

(Continued)

FOREIGN PATENT DOCUMENTS

| | | |
|---|---|---|
| CA | 1 161 525 | 1/1984 |

(Continued)

OTHER PUBLICATIONS

Lookout—Jul. 11, 2000, Moist Mates Moist Toilet Tissue on a Roll.

*Primary Examiner*—Bruce Hess
(74) *Attorney, Agent, or Firm*—Larry L. Huston; David K. Mattheis; Peter D. Meyer

(57) ABSTRACT

An apparatus and process for making sheets having indicia spaced in a machine direction. Between or among the indicia are perforations or chop-off cuts. The spacing, in the machine direction, between the indicia and perforations or chop-off cuts is maintained over long sheet lengths. The product produced using this apparatus and process is typically paper, and particularly can be used for paper towels or placemats.

7 Claims, 2 Drawing Sheets

U.S. PATENT DOCUMENTS

| | | | | |
|---|---|---|---|---|
| 5,341,824 | A | 8/1994 | Fletcher et al. | 131/281 |
| 5,390,599 | A | 2/1995 | Matsumoto et al. | 101/226 |
| 5,401,110 | A | 3/1995 | Neeley | 400/621 |
| 5,458,059 | A | 10/1995 | Ishii | 101/76 |
| 5,458,062 | A | 10/1995 | Goldberg et al. | 101/485 |
| 5,568,767 | A | 10/1996 | Jackson | 101/226 |

FOREIGN PATENT DOCUMENTS

| | | |
|---|---|---|
| EP | 0 267 861 A2 | 5/1988 |
| JP | 07-178892 | 7/1995 |
| WO | WO 92/05959 | 4/1992 |

SHEET HAVING INDICIA REGISTERED WITH LINES OF TERMINATION

This is a continuation of application Ser. No. 08/621,268, filed on Mar. 25, 1996 now abandoned.

FIELD OF THE INVENTION

The present invention relates to registering indicia with lines of termination in a sheet. The lines of termination may be perforations or a chop-off, which ends a first sheet and starts a second sheet, which sheets are typically presented in roll form. The indicia may be visual, such as printed inks or embossments, or may be functional, such as adhesive.

BACKGROUND OF THE INVENTION

Sheets for household use are well known in the art. It is often desired to decorate such sheets, such as by printing. Printing imparts an aesthetically pleasing pattern to the sheet. Alternatively, the sheet may be embossed to impart an aesthetically pleasing pattern which is also tactually discernible.

Such sheets are typically made in continuous form, then later cut to discrete lengths as desired. Such cutting to discrete lengths may occur at the point of use, such as is caused by the consumer detaching one sheet from the balance thereof at a line of termination. For this purpose, the line of termination typically comprises a line of weakness, such as a perforation. Alternatively, the continuous sheet may be cut into discrete portions prior to the point of use. Such an arrangement often occurs in individual napkins which are cut during manufacture and purchased by the consumer as discrete units.

It has been relatively facile in the prior art to register indicia with the cross machine direction of such sheets while such sheets are transported in a continuous fashion during manufacture. However, it is more difficult to register the indicia in the machine direction, and particularly difficult to register the indicia with lines of termination.

One manner with which the foregoing difficulty has been addressed is by keeping the length of the sheet of the continuous sheet path between the point at which the indicia are applied and the point at which the lines weakness are imparted to the sheet relatively short. However, this approach does not provide for feasibility in the manufacturing process, requires smaller sized equipment, and is simply infeasible where the modules necessary to impart the lines of weakness or apply the indicia themselves comprise a web path which is large enough to cause improper spacing between the indicia and the lines of weakness.

Another attempt to address this difficulty has been to keep the length of the path relatively short between the point at which the latter of the indicia and the lines of termination are applied or imparted, respectively, to the continuous sheet and the point at which the continuous sheet is cut to separate it into a discrete unit at the point of manufacture. This approach works well where relatively short discrete sheet lengths are desired, as for example with an individual table napkin.

However, this approach is infeasible where a relatively longer sheet length is desired as, for example, with a roll product, such as toilet tissue or paper toweling. Such difficulty is due to the cumulative error which occurs over the length of the continuous sheet between the point at which the indicia are applied and the lines of perforation imparted to the sheet. By way of example, if a misregistration of 0.001 inches occurs at a first repeating unit of the continuous sheet a misregistration of one inch will occur after 1,000 sheets are manufactured.

For example, referring to FIG. 1, the cumulative error of discrete napkins, each having a machine direction length of about 12 inches is about 0.125 inches. Conversely, the prior art cumulative error over 700 inches of continuous sheet, as for example the approximate length of an ordinary roll of paper toweling, is about 0.5 inches. This greater cumulative error makes it infeasible to use prior art processes to manufacture such rolls of paper toweling.

An even bigger problem occurs in the prior art when the parent roll is exhausted and a new parent roll started. The parent roll is the large roll of product later converted to multiple individual sheets by the apparatus and process disclosed herein. Different parent rolls have different properties which affect the transport of the sheet through the apparatus. For example, the amount of stretch in the sheet as it travels through the apparatus frequently varies greatly between parent rolls. As these properties vary, so does the registration of the indicia with the lines of termination. Such variations in registration must be accounted for in the manufacturing process.

Each vertex of the two graphs in FIG. 1 represents a chop-off cut, where the sheet is cut into a discrete unit from the succeeding sheet. The greater length of the paper toweling sheet results in proportionally greater cumulative error in the sheet.

As used herein, a "unit" is defined as that portion of the sheet which is discrete as delivered to the consumer, as, for example, a single table napkin or a single roll of paper toweling or toilet tissue. It will be apparent that the length of the paper toweling or toilet tissue is significantly greater than the length of the discrete table napkin. The cumulative error will, of course, be greater in the paper toweling or toilet tissue, in an amount proportional to the difference in sheet length.

Accordingly, approaches which are feasible when dealing with discrete articles of relatively short unit length are not sufficient for dealing with registration difficulties which occur in longer sheet lengths. Sheet length is defined as the length of the product, taken in the machine direction, as presented to the consumer. For example, the sheet length of a discrete napkin or placemat is the machine direction length of one napkin or placemat. The sheet length of a roll of perforated paper toweling is the machine direction length of the entire roll, taken from the point of core attachment to the tail seal.

It is therefore an object of this invention to provide a mechanism for overcoming the problems associated with misregistration between indicia and lines of termination in products having longer unit length, and more particularly in core wound paper products, presented to the consumer in roll form. It is also an object of this invention to provide for adjustment of such spacing while the sheet is being transported during manufacture.

SUMMARY OF THE INVENTION

The invention comprises an apparatus for registering indicia with lines of termination in a sheet. The registration occurs while the sheet is being transported through the apparatus. The apparatus comprises a means for transporting a sheet in a first direction, and means for applying indicia to the sheet from a system movable relative to the sheet. The apparatus further comprises a means for imparting lines of termination to the sheet. The apparatus further comprises a means for adjusting the spaced relationship between the indicia and the lines of termination. The adjustment may be made by changing the phase of the indicia or the lines of termination on the sheet. Preferably the lines of termination comprise perforations extending in a direction generally orthogonal to the direction of transport.

In one embodiment, the apparatus may comprise a transport mechanism for transporting the sheet through the apparatus and a blade which imparts a line of termination to the sheet as it is being transported. The apparatus may further comprise a system for applying indicia to the sheet, the indicia being sized to fit between adjacent lines of termination and disposed in spaced relationship thereto. One of the systems for applying the indicia and the blade is adjustable relative to the sheet as it is transported, so that the spacing of the indicia relative to the lines of termination can be adjusted while the sheet is being transported.

In another embodiment, the invention comprises a process for registering indicia and lines of termination in a moving sheet. The process comprises the steps of providing a generally planar sheet. The sheet is transported at a first velocity. Indicia are applied to the sheet from a means for applying the indicia which is movable relative to the sheet at a second velocity. Lines of termination are imparted to the sheet, preferably from a blade movable relative to the sheet at a third velocity. The process finally comprises the steps of varying one of the first, second or third velocities to adjust or maintain the predetermined spacing.

In another embodiment, the invention comprises a sheet having indicia and lines of termination registered with the indicia. The sheet comprises a generally planar sheet transportable in a first direction and the indicia applied to the sheet as it is transported. The sheet further comprises lines of termination being in spaced relationship with the indicia as taken in the first direction. The spaced relationship is variable in the first direction while the sheet is transported. Such variation allows the lines of termination and the indicia to become closer together or further apart, without interruption of the transport of the sheet.

In another embodiment, the sheet may have a principal direction coincident the machine direction of manufacture. The sheet has a length, taken in the principal direction, of at least 500 inches. The sheet further comprises indicia and lines of termination, the indicia and lines of termination being in spaced relationship relative to one another. The spaced relationship is maintained at a tolerance of ±0.125 inches throughout the entire length of the sheet. Preferably the tolerance is maintained within ±0.063 inches.

DETAILED DESCRIPTION OF THE INVENTION

Figure 1:
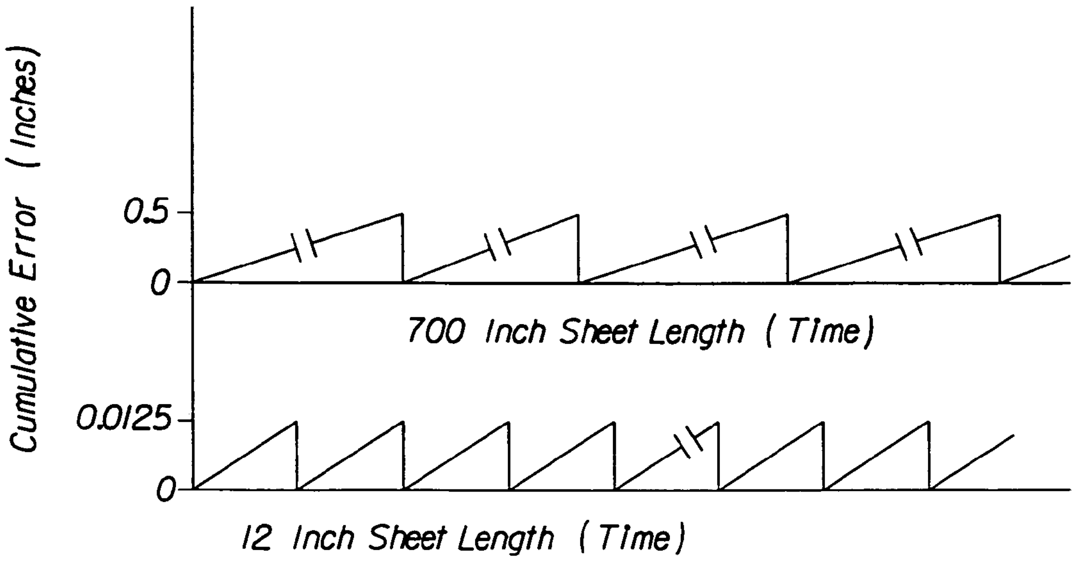
FIG. 1 is a graphical representation of cumulative error in spacing between indicia and lines of termination in discrete length table napkins (bottom absicca) and rolls of paper toweling (top absicca).
Figure 2:
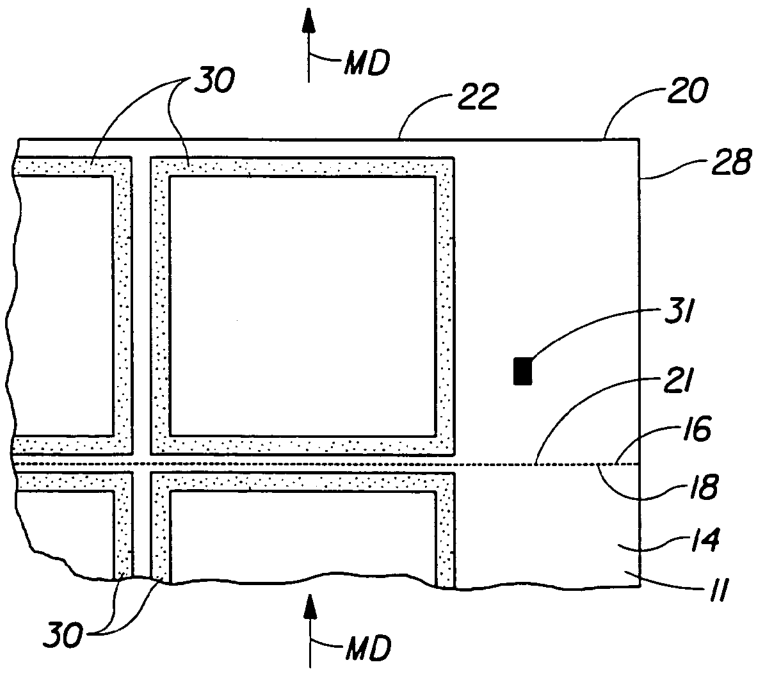
FIG. 2 is a fragmentary top plan view of a sheet according to the present invention, the sheet being part of a web having at least two roll positions.

Referring to FIG. 2, the sheet 14 according to the present invention is generally planar, soft and absorbent. The sheet 14 is suitable for use in application, such as toilet tissue, paper toweling, placemats, napkins, etc. The sheet 14 is preferably wound in roll form. The sheet 14 is cellulosic, and preferably paper. Sheets according to the present invention may be made according to commonly assigned U.S. Pat. No. 4,191,609 issued Mar. 4, 1980 to Trokhan; U.S. Pat. No. 4,637,859 issued Jan. 20, 1987 to Trokhan; and U.S. Pat. No. 5,245,025 issued Sep. 14, 1993 to Trokhan et al., the disclosures of which patents are incorporated herein by reference.

As illustrated by the foregoing patents, the sheet 14 is preferably manufactured in a continuous process, then later cut into discrete units according to how the final product will be distributed to the consumer. Discrete units include roll products (such as paper toweling and bath tissue) and individual sheets (such as table napkins). The sheet 14 is presented to the consumer as an individual unit having a sheet length.

The product is preferably presented to the consumer in roll form, wound in a spiral about a core to yield a core wound paper product. The core wound paper product has a length taken in the principal, or first direction. Indicia 30 and lines of termination 20 are disposed in spaced relation throughout the sheet 14. The indicia 30 may be intermediate or straddle the lines of termination 20.

The length of a sheet 14 is its unfolded dimension taken in a first direction. The first direction is coincident the machine direction of the sheet 14 during its manufacture and while in continuous form. The first direction is also the principal direction of the sheet length. Plies or layers making up the sheet 14 are not separated when determining its length.

The leading and trailing edges 16, 18 of the sheet 14 are defined by lines of termination 20. The lines of termination 20 are the lines separating the sheet 14, as presented to the consumer, into discrete units—if such separation has not been performed at the time of manufacture. Typical lines of termination 20 include both perforations 21 and chop-off cuts 22. Perforations 21 are lines of weakness which allow separation of the sheet 14 into discrete units by the consumer as needed. Chop-off cuts 22 separate an individual sheet 14 from the adjacent sheet 14 in the manufacturing process, or terminate one roll and start the succeeding roll in the manufacturing process. Coincident with each line of termination is a leading edge and a trailing edge 16, 18 of the sheet 14, the leading edge 16 being ahead of the trailing edge 18 in the manufacturing process.

Preferably the lines of termination 20, particularly the perforations 21, are oriented in the cross-machine direction and are transverse to the first direction of transport of the sheet 14. Alternatively, it will be recognized that lines of termination 20 having a diagonal orientation or having any other spaced relationship in the machine direction may be utilized.

Two longitudinal edges 28 connect the leading and trailing edges 16, 18. The longitudinal edges 28 are oriented substantially in the longitudinal, or first, direction. While the embodiment in FIG. 2 shows the longitudinal edges 28 being straight and parallel, and the leading and trailing edges 16, 18 being straight and parallel, it will be recognized by one of ordinary skill that depending upon the arrangement used to cut the longitudinal edges 28 from the trim of the sheet 14, the longitudinal edges 28 need not be either straight or parallel as shown in the preferred embodiment. Likewise, the leading and trailing edges 16, 18 need not be straight and parallel as shown.

The sheet 14 is transported through the apparatus 10 by any suitable means. Typically the sheet 14 is drawn through the apparatus 10 under tension. Tension may be applied to the sheet 14 by winding it about a rotatable reel. The rotatable reel may be cylindrical and driven by an electric motor at a predetermined angular velocity. A suitable electric motor is a direct current synchronous motor delivering about 30 horsepower at 3000 rpm. A particularly preferred motor is available from the Reliance Electric Co. of Cleveland, Ohio.

Juxtaposed with the leading and trailing edges 18 of the sheet 14, and generally oriented in a second direction which is within the plane of the sheet 14 and generally orthogonal to the first direction are indicia 30. The indicia 30 are spaced from the lines of termination 20 so that a spaced relationship is formed therebetween. The spaced relationship is predetermined and may be adjusted during manufacture. The indicia 30 may be aesthetically pleasing and printed, either in a single color or in a plurality of colors. Alternatively, the indicia 30 may be embossed.

Preferably the indicia 30 are applied to the sheet 14 while it is being transported through the apparatus 10 described below. The indicia 30 may be applied to the sheet 14 by any means known in the art suitable for applying spaced indicia 30 at predetermined repeating intervals. In a preferred embodiment, the indicia 30 are printed onto the sheet 14 from a rotatable cylinder. The rotatable cylinder is driven about a central axis at a predetermined angular velocity. Suitable printing processes known in the art include gravure printing and flexographic printing. A suitable apparatus 10 for applying the indicia 30 to the substrate is disclosed in commonly assigned patent 5,213,037 issued May 25, 1993 to Leopardi, II, the disclosure of which patent is incorporated herein by reference.

The print cylinder 34, or other means for applying the indicia 32 to the sheet 14, may be driven by any suitable means, such as an electric motor. A suitable electric motor is a direct current synchronous motor delivering about 25–125 horsepower at a predetermined angular velocity of 1700 to 1800 rpm.

If it is desired to emboss the indicia 30 onto the sheet 14, any embossing technique well known in the art is suitable. Suitable embossing techniques include those described in commonly assigned U.S. Pat. No. 3,414,459 issued Dec. 3, 1968 to Wells; U.S. Pat. No. 3,556,907 issued Jan. 19, 1971 to Nystrand; and U.S. Pat. No. 5,294,475 issued Mar. 15, 1994 to McNeil, the disclosures of which are incorporated herein by reference.

In an alternative embodiment, the indicia 30 may impart functional properties to the sheet 14 rather than visual or aesthetically pleasing properties. In such an embodiment, the indicia 30 may comprise adhesive, as, for example, would be used to join two plies together to form a sheet 14 having a double thickness. Alternatively, functional indicia 30 can be used to change properties at one portion of the sheet 14 relative to another portion of the sheet 14. For example, adhesive used to join the tail of a core wound product to the periphery of the product may be applied to the sheet 14, as well as adhesive used to join the leading edge of a sheet 14 to the core about which the sheet 14 is wound.

Alternatively, known additives which increase the softness, wet strength, temporary wet strength, hydrophobicity/hydrophilicity, or which functionally affects any other property of the sheet 14 may be applied thereto. A device which may be used in intermittent operation and suitable for applying functional indicia 30, such as adhesive, to the sheet 14 is disclosed in commonly assigned U.S. Pat. No. 5,143,776 issued Sep. 1, 1992 to Givens, the disclosure of which is incorporated herein by reference.

Typically the means for applying the indicia 32 need only have the capability of applying the indicia 30 in spaced apart relationship in the first direction and to apply the indicia 30 at a frequency yielding indicia 30 at predetermined repeating intervals. The indicia 30 may be applied by any suitable system. A suitable system comprises a rotatable cylinder, driven to rotate about a central axis.

In addition to indicia 30 applied at repeating intervals spaced apart in the first direction and in spaced relationship to the lines of termination 20, indicia 30 may be juxtaposed with one or both of the longitudinal edges 28. If each of the leading, trailing and longitudinal edges 28 have indicia 30 juxtaposed therewith, a border is formed in the sheet 14. This border can define and enhance the appearance, or functionality, of the sheet.

Figure 3:
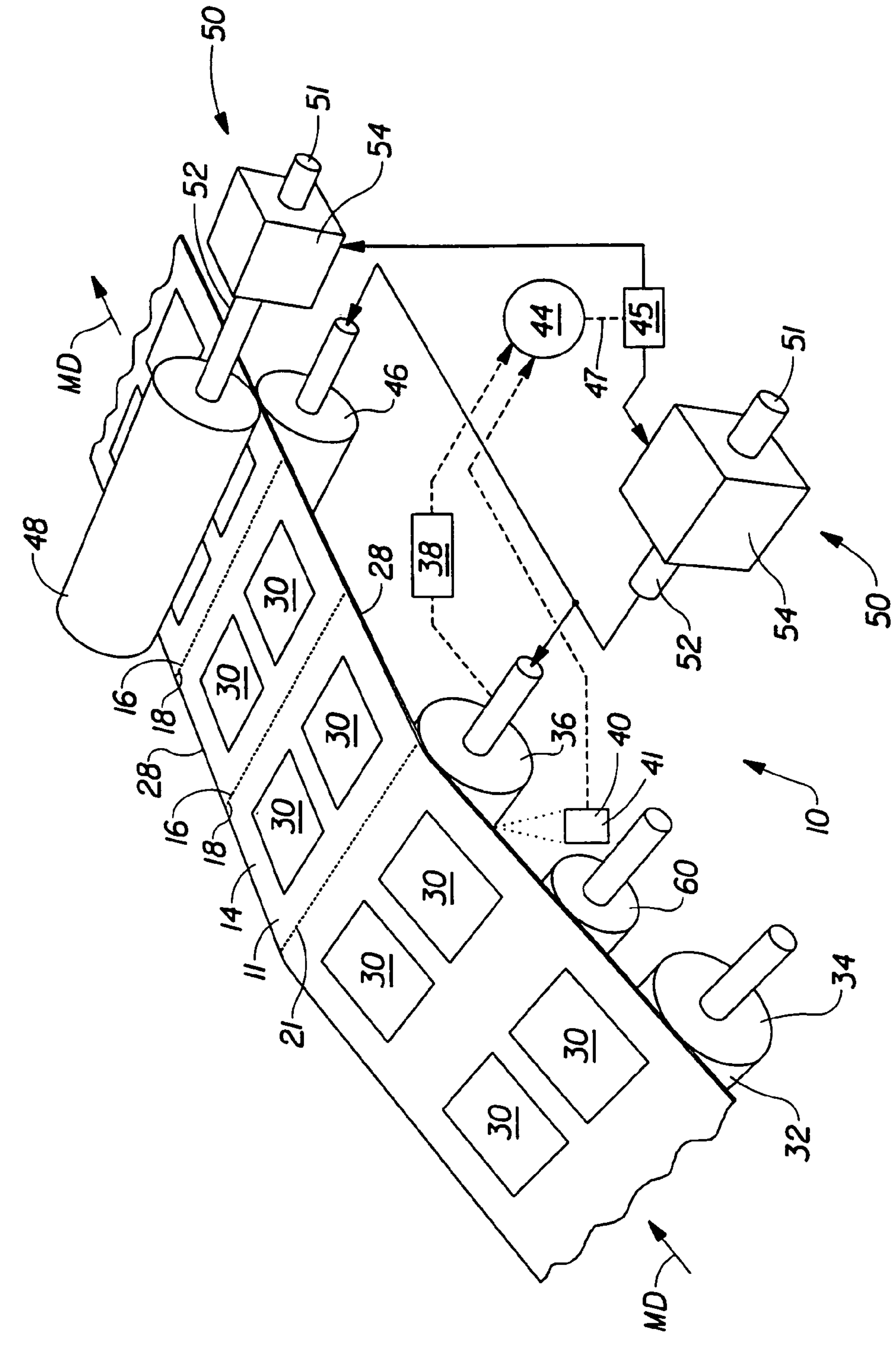
FIG. 3 is a schematic perspective view of an apparatus according to the present invention having control signals designated by a dashed line and mechanical connections designated by solid lines.

Referring to FIG. 3, the lines of termination 20 may be applied by any suitable means for imparting lines of termination 20 to the sheet 14. The suitable means must also apply the lines of termination 20 at a frequency which yields predetermined repeating intervals. As noted above, the lines of termination 20 may totally separate the continuous sheet into discrete units, or may provide lines of weakness, such as perforations 21. Suitable means for imparting the lines of termination 20 include blades which are generally orthogonal to and impart lines of termination 20 generally orthogonal to the first direction of transport of the sheet 14, and which define adjacent leading and trailing edges 18 of successive sheets 14.

A suitable means for imparting the line of termination comprises a rotatable blade 36 driven about a central axis at a predetermined angular velocity on a perforator roll. Of course, one or more rotatable blades 36 may be driven on a common shaft, as is well known in the art. A rotatable blade 36 suitable for imparting perforations 21 to the sheet 14 is disclosed in commonly assigned U.S. Pat. No. 5,114,771 issued May 19, 1992 to Ogg et al., the disclosure of which is incorporated herein by reference.

If the line of termination is the chop-off, it may be accomplished by two rotatable rolls juxtaposed together, a chop off roll and a bed roll 48, as is well known in the art. Of course, even if the lines of termination 20 which are the subject of the present invention are perforations 21, the apparatus 10 will likely still comprise a chop-off roll 46 and a bed roll 48 to separate adjacent sheets, each having a plurality of perforations 21. A particularly preferred embodiment of chop off and bed rolls 48 is disclosed in commonly assigned patent 4,919,351 issued Apr. 24, 1990 to McNeil, the disclosure of which is incorporated herein by reference.

The rotatable blade 36, or other means for imparting the lines of termination 20 to the sheet, may also be driven by any suitable means, such as an electric motor, as set forth above. If both a perforator blade and chop-off blade are used in the apparatus 10, they may be driven by independent motors, or by a common motor.

Generally two types of motors are used with the present apparatus 10. The first type of motor is described above. This type comprises one or more draw or drive motors which impart angular velocity to one or more rotatable components of the apparatus 10. This first type of motor is generally more powerful and coarser in adjustment than the second type of motor. The first type of motor is connected to the rotatable component through a differential 50. Generally, the draw or drive motor(s) also transport the sheet 14 through the apparatus 10, due to the angular velocity imparted to the sheet 14 by the rotatable components of the apparatus 10.

The differential 50 comprises a mechanical drive capable of altering the angular velocity of the output shaft 52 within a resolution of at least 0.001 percent of the baseline angular velocity of the output shaft 52. Preferably this resolution is maintained over a range of ±4 percent of the baseline angular velocity of the output shaft 52. Typically, the output shafts 52 have an angular velocity of 200 to 1500 rpms. The differential 50 provides for angular adjustment of less than 1 rpm.

The differential 50 comprises an output shaft 52 coupled to the rotatable component. The output shaft 52 rotates with respect to the cage 54 of the differential 50, which houses and rotatably mounts the output shaft 52. A suitable phasing differential 50 is supplied by Andantex, Inc. of Wanamassa, N.J. as a Model No. SA30 epicyclic unit.

The second type of motor is a correction motor, typically a servo-motor. This second type of motor drives the cage 54 of the differential 50, so that the angular velocity of the cage 54 is superimposed with the angular velocity of the input shaft 51. Such superposition yields a very accurate and well controlled angular velocity at the output shaft 52. The correction motors typically are about 2 to 4 hp.

The correction motors can be precisely and accurately adjusted to a particular angular velocity, independent of the angular velocity of the draw or drive motor. Moreover, as the angular velocity of the draw or drive motor changes, compensation can be made by the correction motor as the sheet 14 is being transported through the apparatus 10, without interruption of the transport of the sheet. Compensation can also be made as the sheet 14 is being transported through the apparatus 10, and without interruption of the transport of the sheet, should web tension change, or should any other factor change the spaced relationship between the lines of termination 20 and the indicia 30.

The lines of termination 20 and indicia 30 may be imparted and applied to the sheet, respectively, in any desired order. However, the latter of the lines of termination 20 and indicia 30 to be imparted or applied to the sheet 14 constitutes the operation controlled by the apparatus 10 to maintain the desired spaced relationship therebetween.

By way of example, the indicia 30 are applied to the sheet. Then the lines of termination 20 are imparted to the sheet. If the sheet 14 has both perforations 21 and a chop-off cut, typically the perforations 21 are imparted prior to the chop-off cut. In the above described system having the indicia 30 first applied, the desired spacing of the lines of termination 20 relative to the indicia 30 is achieved and maintained by adjusting the placement of the lines of termination 20, rather than by adjusting the placement of the indicia 30.

The apparatus 10 may particularly comprise a sheet length correction motor 45. The sheet length correction motor 45 controls the angular velocities of the perforator roll, chop-off roll 46 and bed roll 48. If the product is supplied as a core wound product, as for example is common with toilet tissue and paper toweling, the sheet length correction motor 45 may further control the angular velocity of the indexing turret and core loading functions of that turret. The turret winds the product onto the core and performs the other functions ancillary to core winding, such as core loading onto the mandrel, applying adhesive to the core, chop-off of the sheet, applying tail seal adhesive to the end of the sheet, etc.

A preferred system having a sheet length correction motor 45 is illustrated in commonly assigned patent 4,687,153 issued Aug. 18, 1987 to McNeil, the disclosure of which is incorporated herein by reference. A differential 50 is disposed functionally intermediate the sheet length correction motor 45 and the means for imparting the lines of termination 20 to the sheet.

The apparatus 10 further comprises a means for determining the position of the means for imparting lines of termination 20 or the means for applying indicia 30 to the sheet 14, whichever occurs later in the manufacturing process. A typical means for determining position is a position resolver 38 linked to the rotatable blade 36, or other component, such as the print cylinder 34, to be controlled in response to the error signal.

A suitable position resolver 38 is capable of determining angular position within at least 0.1 degrees. A preferred position resolver 38 has 4,096 pulses per rotation. A suitable position resolver 38 is available from the Reliance Electric Co. of Cleveland, Ohio as Model No. M/N 57C360 and is typically designated by the motor which drives the rotatable component from which the signal is taken. The resolver may be used in conjunction with a resolver input module, such as is available from Reliance Electric as Part No. M/N 57C411. If desired, an encoder can be substituted for the position resolver 38, provided one uses the appropriate control logic, as is well known in the art.

The apparatus 10 further comprises a means for sensing the position of the indicia 30 to the sheet. Preferably the determination is made by sensing the difference in reflectance between the indicia 30 and the sheet.

Two such means for sensing position 40 should be provided. Preferably the means are located on opposite sides of the sheet, at coincident locations as taken in the cross machine direction. Each such means determines the position of the indicia 30 on its respective side of the sheet. The positions of the indicia 30 are compared for skew, and cross machine direction skew is corrected as necessary, using means well known in the art such as cocking rolls or other members which influence path length. For purposes of maintaining the desired spaced relationship discussed above, the two positions of the indicia 30 sensed on the opposite sides of the sheet 14 are averaged and a single position is used in generating the error signal.

Of course, the indicia 30 may not provide adequate contrast with the sheet. In this case a registration mark 31 may be applied to the sheet 14 in register with the indicia 30. If a registration mark 31 is applied to the sheet, preferably it is applied to the trim of the sheet. Trim refers to that portion of the sheet 14 at the outboard edges, and which is later removed from the portion of the sheet 14 which is presented to the consumer. Since the trim is not presented to the consumer, the registration mark 31 may be of any size and shape suitable for indicating its position to the sensing means. Preferably the registration mark 31 is printed onto the sheet 14 by the same printing plate used to print the indicia 30. In this manner the spacing of the registration mark 31 relative to the indicia 30, or any part thereof, is known.

Thus, the desired spacing of the indicia 30 relative to the lines of termination 20 is likewise known. The desired spacing may be zero, whereby the registration mark 31 (or portion of the indicia 30 detected by the sensing means) is coincident the lines of termination 20. Alternatively, the registration mark 31 (or portion of the indicia 30 detected by the sensing means) may be offset in either direction from the lines of termination 20.

The apparatus 10 may further comprise a signal comparator 44. The signal comparator 44 is capable of subtracting two input signals to produce an error signal. The first input signal to the signal comparator 44 is the actual spacing between the indicia 30 (or the registration mark 31) and lines of termination 20. This input signal may be provided in seconds, based upon the distance between the indicia 30 and lines of termination 20 and the speed at which the sheet 14 is transported through the apparatus 10. A suitable signal comparator is a Reliance Electric AutoMax Processor Module comprising the resolver photo eyes and resolver input cards.

The second input signal to the signal comparator 44 is the position of the means for imparting lines of termination 20 to the sheet 14. The signal comparator 44 subtracts the two input signals to yield an error signal. When the error signal exceeds a preset value, the apparatus 10 makes correction. The preset value is the desired spacing between the indicia 30 (or registration mark 31) and lines of termination 20. Suitable preset values for use with the present invention are ±0.125 inches (for a total range of 0.25 inches), and preferably ±0.063 inches (for a total range of 0.125 inches) over the entire length of the sheet 14.

To make correction, the apparatus 10 activates the appropriate motor, such as the sheet length correction motor 45. The appropriate motor adjusts the placement of the lines of termination 20 on the sheet, so that the lines of termination 20 may be brought closer to or further from the indicia 30, thereby changing the spaced relationship therebetween. Such correction occurs while the sheet 14 is being transported through the apparatus 10 and without interruption of the transport. This moving correction is feasible because the appropriate motor is adjusted while it turns at a predetermined angular velocity.

In an alternative embodiment, the means for changing the spaced relationship between the indicia 30 and the lines of termination 20 may be any means which changes the path length of the sheet 14 between the means for applying the indicia 32 and the means for imparting the lines of termination 20. The path length of the sheet 14 may be changed by using an idler roll 60 which moves in a direction having a component orthogonal to the machine direction, as indicated by arrow 61, and preferably orthogonal to the path of the sheet 14 at the particular position of the idler roll 60. Suitable idler rolls 60 are available in well known tracking systems, and are available from the Fife Company and the Mount Hope Company. Alternatively, the sheet path length may be changed by deflecting the web 11 with air jets or other non-contacting means.

Another means for changing the sheet path length is to change the length of the sheet 14 within the path. Using this means, the tension applied to the sheet 14 (such as by the draw motor) is changed as the sheet 14 is transported between the means for imparting the lines of termination 20 and the means for applying the indicia 32. Sheet tension may be changed throughout this portion of the apparatus 10, as is well known in the art, by using driven rolls at positions intermediate such means, or by constantly increasing the draw of the sheet 14 through the apparatus 10 (for example by using the draw motor).

Yet another means to change the spaced relationship between the indicia 30 and the lines of termination 20 comprises incrementally changing the angular velocity of either or both of the means for imparting the lines of termination 20 or the means for applying the indicia 32. This may be accomplished by discrete adjustments to the phasing of such means on an as-needed basis, given the instantaneous value of the error signal discussed above.

One of ordinary skill will recognize that any of the three foregoing means for changing the spaced relationship between the indicia 30 and the lines of termination 20 can be collectively considered as a means for changing the phase of the lines of termination 20 relative to the indicia 30 or vice versa. Such change of phase is accomplished by changing the phase of one or both of the means for imparting the lines of termination 20 or the means for applying the indicia 32.

In operation, the sheet 14 is moved relative to the apparatus 10, preferably by holding the apparatus 10 stationary and drawing the sheet 14 through the apparatus 10 in the machine direction. The sheet 14 may be drawn through the apparatus 10 with a motor driving any suitable roll or rolls which frictionally engage the sheet 14 as it is drawn through the apparatus 10. A draw motor is typically used in conjunction with a draw correction motor for this purpose.

Preferably the first step performed by the apparatus 10 is to apply the indicia 30 to the sheet. The indicia 30 may be applied by a rotatable print cylinder 34 having a predetermined angular velocity, such as is used in flexographic or gravure printing. The rotatable print cylinder 34 is preferably driven independently from the draw motor and draw correction motor used to transport the sheet 14 through the apparatus 10. The indicia 30 may include registration marks 31 which are later trimmed from the sides of the sheets. The registration marks 31, or a point on the indicia 30 which are presented to the consumer, are optically detectable.

The second step performed by the apparatus 10 is detection of the indicia 30 (or registration mark 31). Detection is performed by a photocell 41, based upon the difference in reflectance between the indicia 30 and the background. For accuracy, the photocell 41 is preferably disposed just before the rotatable blade 36.

The third step performed by the apparatus 10 is to impart the lines of termination 20 to the sheet. The lines of termination 20 are placed on the sheet 14 in spaced relationship to the indicia 30. The spacing is in the first, or machine direction. The lines of termination 20 are preferably perforations 21, but may be the chop-off cut 22. The lines of termination 20 are preferably oriented in the cross machine direction.

The fourth step performed by the apparatus 10 is determination of the position of the perforations 21, or other lines of termination 20. This determination is made by knowing the position of the rotatable blade 36 which imparts the perforations 21 to the sheet 14. The position of the rotatable blade 36 is given by a resolver 38 which determines the position of the rotatable blade 36, and hence the perforations 21 imparted by the rotatable blade 36.

The difference in position between the indicia 30 and the perforations 21 is determined by a signal comparator 44. This difference constitutes an error signal. If the difference exceeds, in either direction, a preset limit, correction is made.

Correction may be made by adjusting the angular velocity of the draw correction motor, the sheet length correction motor 45, the rotatable blade 36, or the rotatable print cylinder 34. Preferably the correction is made by adjusting the angular velocity of a sheet length correction motor 45. The sheet length correction motor 45 controls the angular velocity of the rotatable blade 36 which imparts the perforations 21, as well as the chop-off roll 46 and bed roll 48, as well as functions downstream of the apparatus 10.

Particularly, the correction is preferably done by adjusting the angular velocity of the rotatable blade 36, relative to the velocity of the sheet. This angular velocity is increased or decreased, as needed, until the error signal comes within the preset limit.

In a preferred embodiment, the sheet 14 according to the present invention is presented to the consumer as a core wound or rolled paper product. Such a product is suitable for use as paper toweling, placemats, etc.

The sheet 14 may have a length in the principal direction of at least 500 inches, preferably at least 700 inches, more preferably at least 900 inches, and most preferably at least 1100 inches.

Intermediate the lines of termination 20 which define the length of the sheet, may be a plurality of lines of termination 20 which provide a line of weakness. Preferably such lines of weakness comprise perforations 21. The perforations 21 may be spaced on a pitch of about 4.0 to 20 inches, with a preferred pitch of about 4.5 to 14 inches, and a more preferred pitch of about 12.0 to 12.5 inches. The perforations 21 are generally oriented in the cross-machine direction, and are generally orthogonal to the direction of transport of the sheet 14 through the apparatus 10. Preferably, but not necessarily, the perforations 21 extend throughout the width of the product, as measured between the longitudinal edges 28 of the sheet.

In such an embodiment, the indicia 30 are maintained in spaced relationship to the perforations 21. Preferably the indicia 30 are registered between the perforations 21 and juxtaposed with both the leading and trailing edges 18 of the sheet. In this manner, symmetry about the cross-machine direction centerline of the sheet 14 is obtained. Optionally, indicia 30 may be registered with the longitudinal edges 28 of the sheet 14 so that symmetry about the machine direction centerline of the sheet 14 is also obtained.

Of course, it will be recognized by one skilled in the art that several sheets according to the present invention may be made in parallel, by using multiple roll positions as is known in the art. In such a process, a single web 11 having a width several times greater than the sheet 14 presented to the consumer is transported through the apparatus 10. As used herein, a "web" comprises a plurality of sheets integral with one another and simultaneously transported through the apparatus 10 in parallel in the cross-machine direction.

The web 11 is later slit or cut, in the machine direction, into individual sheets. Trim is also removed from the longitudinal edges 28 of the web 11, as discussed above with respect to single sheet widths.

Multiple indicia 30 and multiple lines of termination 20 are imparted to the sheet 14 in parallel across the width of the web 11. The web 11 is later slit or cut into individual sheets, as desired. Of course, it will be recognized by one of ordinary skill within such an embodiment, the means for sensing the position 40 of the indicia 30 on the sheet 14 will be in spaced relationship in the cross-machine direction. If desired, one may add a plurality of additional means for sensing the position 40 of the indicia 30 at intermediate positions across the width of the web 11.

Of course, one of ordinary skill will recognize it may be desired to adjust the cross-machine direction registration of the web 11. Misregistration of the web 11 in the cross-machine direction causes skew in the aforementioned spaced relationship. One may compensate for such skew by adjusting the path length of the web 11, using means well known in the art. For example, bowed rolls, curved axis rolls having fixed and variable radii of curvature, cocking rolls, Mount Hope rolls, etc. may be used to change the path length of one portion of the web 11, or even an individual sheet, relative to the balance of the web 11 or sheet 14.

What is claimed is:

1. A core wound paper product comprising:

a sheet wound about said core, said sheet having a principal direction and a length of at least 500 inches in said principal direction;

spaced apart indicia, said indicia being disposed throughout said principal direction of said sheet; and lines of termination disposed throughout said principal direction of said sheet, said lines of termination being generally transverse said principal direction, said lines of termination being registered with said indicia in said principal direction, said registration varying less than about ±0.125 inches in said principal direction throughout the length of said sheet, said indicia and said lines of termination being simultaneously impartable to different portions of said sheet, said different portions being spaced apart along the length of said sheet.

2. A core wound paper product according to claim 1 wherein said sheet has a length of at least 700 inches.

3. A core wound paper product according to claim 2 wherein said registration is maintained in said principal direction within about ±0.063 inches throughout said length of said sheet.

4. A core wound paper product according to claim 1 wherein said sheet has a length of at least 900 inches.

5. A core wound paper product according to claim 4 wherein said registration is maintained within about ±0.063 inches throughout said length of said sheet.

6. A core wound paper product according to claim 1 wherein said registration is maintained in said principal direction within about ±0.063 inches throughout said length of said sheet.

7. A core wound paper product according to claim 4 further comprising indicia oriented in said principal direction.

* * * * *